UNITED STATES PATENT OFFICE.

GRANT HAMMOND, OF MULBERRY, CALIFORNIA.

SOLDER FOR SOLDERING ALUMINIUM.

SPECIFICATION forming part of Letters Patent No. 572,200, dated December 1, 1896.

Application filed January 8, 1896. Serial No. 574,725. (No specimens.)

*To all whom it may concern:*

Be it known that I, GRANT HAMMOND, a citizen of the United States, residing at Mulberry, in the county of San Benito and State of California, have invented certain new and useful Improvements in Solder for Soldering Aluminium; and I do hereby declare the following to be a full, clear, and exact description of the invention, such as will enable others skilled in the art to which it appertains to make and use the same.

This invention has for its object the provision of a solder designed for soldering aluminium, and has for a further object to provide a simple, cheap, and easily-applied solder.

Other objects and advantages of the invention will hereinafter appear, and the novel features will be particularly pointed out in the appended claim.

In making my improved solder I take by weight thirty (30) parts tin, four (4) parts aluminium, and three (3) parts zinc. The tin and aluminium are first melted together and then the zinc added. The metals when melted must be well stirred to insure perfect mixture. I preferably run the product into a mold.

In using the solder, first scrape the parts to be soldered with a scraper or other implement, being careful to make it clean and bright. Sprinkle the parts to be soldered with powdered rosin and apply with a copper soldering-iron, which must be very hot.

The proportions hereinbefore stated may be varied within certain limits without departing from the essence of the invention or destroying the efficacy of the result.

Having thus described the invention, what is claimed as new is—

As an improved article of manufacture, a solder for aluminium, consisting of an alloy of tin, thirty parts, aluminium, four parts, and zinc, three parts, substantially as described.

In testimony whereof I have signed this specification in the presence of two subscribing witnesses.

GRANT HAMMOND.

Witnesses:
 A. E. MOORE,
 JOHN ABREY.